# 3,378,582
(α-PHENOXY)- AND (α-PHENYLTHIO)-OMEGA-PHENYL-ALKANOIC ACIDS
William A. Bolhofer, Frederick, Pa., assignor to Merck & Co., Inc., Rahway, N.J., a corporation of New Jersey
No Drawing. Continuation-in-part of application Ser. No. 353,579, Mar. 20, 1964. This application Jan. 29, 1965, Ser. No. 429,130
6 Claims. (Cl. 260—520)

This application is a continuation-in-part of my co-pending patent application No. 353,579 filed Mar. 20, 1964, now abandoned.

This invention relates to a new class of (alpha-phenoxy) and (alpha-phenylthio) substituted omega-phenyl-alkanoic acids and to the non-toxic, pharmacologically acceptable acid addition salts, esters and amide derivatives thereof, which have valuable hypocholesterolemic activity and which are thus useful in the treatment of atherosclerosis.

Clinical studies show that cholesterol apparently plays a major role in the formation of atherosclerotic plaques by accelerating the deposition of blood lipids in the arterial wall. It is the purpose of this invention to disclose a new class of chemical compounds which effectively reduces the concentration of cholesterol and other lipids in blood serum and thus ameliorates the condition usually associated with blood lipid deposition.

The (alpha-phenoxy) and (alpha-phenylthio) substituted omega-phenyl-alkanoic acids of this invention are compounds which contain a single substituent in the (alpha-phenoxy) or (alpha-phenylthio) ring and which contain 1–2 substituents in the omega-phenyl nucleus. The products have the following general formula:

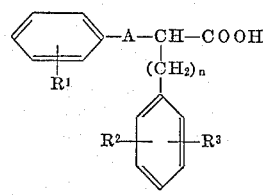

wherein A is a member selected from the group consisting of oxygen and sulfur; $R^1$ is a member selected from the group consisting of halogen, for example, chlorine, bromine, fluorine, etc., lower alkenyl, for example, vinyl, allyl, etc., haloalkyl, for example, chloromethyl, trifluoromethyl, etc., lower alkanoyl, for example, acetyl, propionyl, butyryl, etc., aryl, for example, mononuclear aryl such as phenyl, tolyl, xylyl, etc., aralkyl, for example, mononuclear aralkyl such as benzyl, phenethyl, etc., aralkenyl, for example, mononuclear aralkenyl such as styryl, 3-phenyl-1-propenyl, etc., aryloxy, for example, mononuclear aryloxy such as phenoxy, etc., aralkoxy, for example, mononuclear aralkoxy such as benzyloxy, etc., arylthio, for example, mononuclear arylthio such as phenylthio, etc., arylamino, for example, mononuclear arylamino such as anilino, toluidino, etc., carboxy, lower alkylthio, for example, methylthio, ethylthio, etc., lower alkylsulfonyl, for example, methylsulfonyl, ethylsulfonyl, etc., cyano, nitroso, amino, mono- and di-alkylamino, for example, mono- and di-lower alkylamino such as ethyl-amino, dimethylamino, diethylamino, etc.; $R^2$ and $R^3$ are the same or different members selected from the group consisting of hydrogen, halogen, lower alkyl, for example, methyl, ethyl, etc., and lower alkoxy, for example, methoxy, ethoxy, etc.; and $n$ is an integer having a value of 1–2.

This invention also relates to the acid addition salts of the instant (alpha-phenoxy)- and (alpha-phenylthio)-omega-phenyl-alkanoic acids, which salts are prepared by the reaction of the said acids with a base having a non-toxic, pharmacologically acceptable cation. In general, any base which will form an acid addition salt with a carboxylic acid and whose pharmacological properties will not cause an adverse physiological effect when ingested by the body system is considered as being within the scope of this invention. Suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, for example, piperidine, etc. The acid addition salts thus produced are the functional equivalent of the corresponding (alpha-phenoxy- and (alpha-phenylthio)-omega-phenyl-alkanoic acid products and one skilled in the art will appreciate that, to the extent that the acids of the invention are useful in therapy, the variety of acid addition salts embraced by this invention are limited only by the criterion that the bases employed in forming the salts be both non-toxic and physiologically acceptable.

This invention also relates to the ester and amide derivatives of the instant products, which derivatives are prepared by conventional methods well-known to those skilled in the art. Thus, for example, the ester derivatives may be prepared by the reaction of an (alpha-phenoxy) or (alpha-phenylthio) substituted omega-phenyl-alkanoic acid of this invention with an alcohol, as for example, with a lower alkyl alcohol or, alternatively, the (alpha-phenoxy)- or (alpha-phenylthio)-omega-phenyl-alkanoic acid may be converted to its acid halide by conventional methods and the acid halide thus formed may be reacted with an appropriate lower alkanol. The desired ester derivatives of this invention may also be prepared inherently by employing, in the process hereinafter disclosed for the preparation of the instant products, the appropriate ester of the phenyl-alkanoic acid reactant. The amide derivatives of the instant products may be prepared by treating the acid halide of the said acids with ammonia or an appropriate mono- or di-alkylamine to produce the corresponding amide. Still another process for preparing the said amide derivatives comprises the conversion of an ester derivative of an (alpha-phenoxy)- or (alpha-phenylthio)-omega-phenyl-alkanoic acid to its corresponding amide by treating the said ester with ammonia or an appropriate monoalkylamine or dialkylamine to produce the corresponding amide compound. These and other equivalent methods for the preparation of the ester and amide derivatives of the instant products will be apparent to one having ordinary skill in the art and to the extent that the said derivatives are both non-toxic and physiologically acceptable to the body system the said esters and amides are the functional equivalent of the corresponding (alpha-phenoxy)- and (alpha-phenylthio)-omega-phenyl-alkanoic acids.

A preferred subgroup of compounds according to this invention are the (alpha-phenoxy)-omega-phenyl-alkanoic acids having the following general formula:

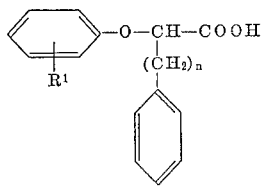

wherein $R^1$ is a member selected from the group consisting of halogen, for example, chlorine, bromine, fluorine, etc. and lower alkanoyl, for example, acetyl, propionyl, butyryl, etc. and $n$ is an integer having a value of 1–2. Also included within the preferred embodiment are the non-toxic, pharmacologically acceptable acid addition salts, esters and amide derivatives of the (alpha-phenoxy)-omega-phenyl-alkanoic acid products described above; for example, the alkali metal and alkaline earth metal salts thereof such as the sodium, potassium or calcium salts, the lower alkyl esters thereof, for example, the corresponding ethyl, propyl or butyl esters and the corresponding amide derivatives of the above-described products, for example, the mono-lower alkylamido and di-lower alkylamido derivatives thereof, such as the methylamido, ethylamido, dimethylamido, diethylamido, etc., derivatives.

The (alpha-phenoxy) and (alpha-phenylthio) substituted omega-phenyl-alkanoic acids of the invention are conveniently prepared by the reaction of an alkali metal salt of an appropriate nuclear substituted phenol or thiophenol with an hydrocarbyl ester of an omega-phenyl substituted alpha-haloalkanoic acid, followed by hydrolysis of the (alpha-phenoxy) or (alpha-phenylthio) substituted omega-phenyl-alkanoic acid ester thus formed with a suitable base. By "hydrocarbyl" is meant, a monovalent organic radical composed solely of carbon and hydrogen, for example, a lower alkyl radical such as methyl, ethyl, propyl, etc. The following equation illustrates this method of preparation:

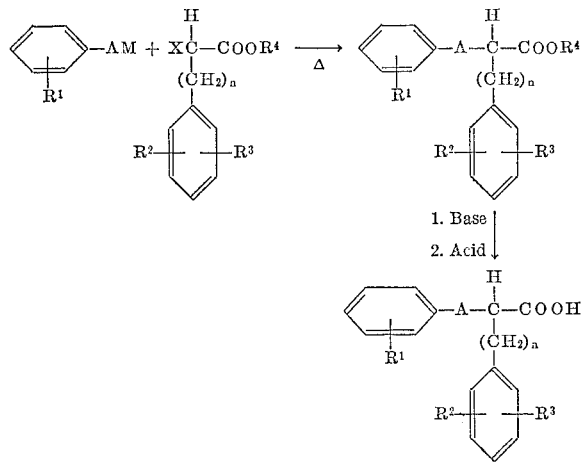

wherein A, R, $R^1$, $R^2$, $R^3$ and $n$ are as defined above; M is an alkali metal cation, for example, a cation derived from an alkali metal alkoxide, such as sodium alkoxide, etc.; $R^4$ represents an hydrocarbyl radical, for example, a lower alkyl radical such as methyl, ethyl, etc., or an aryl radical, for example, phenyl, etc.; and X represents halogen, for example, chlorine, bromine, etc. The reaction is preferably conducted with heating as, for example, by heating on a steam bath for periods of two to twenty hours. Suitable bases and acids for use in the above reaction include, for example, sodium hydroxide, potassium carbonate, etc. and hydrochloric acid.

The esterified omega-phenyl substituted alpha-haloalkanoic acids employed as the reactants in the foregoing process are conveniently prepared by treating an appropriate nuclear substituted or nuclear unsubstituted omega-phenyl-alkanoic acid with thionyl chloride to produce the corresponding acid halide; followed by the treatment of the acid chloride thus formed with a suitable halogenating agent such as bromine, chlorine, etc., to produce the appropriate omega-phenyl-alpha-haloalkanoic acid chloride. The said omega-phenyl-alpha-haloalkanoic acid chloride is then treated with an appropriate alcohol as, for example, with methanol, ethanol, etc., to obtain the desired omega-phenyl-alpha-haloalkanoic acid ester. The following equation illustrates this method of preparation:

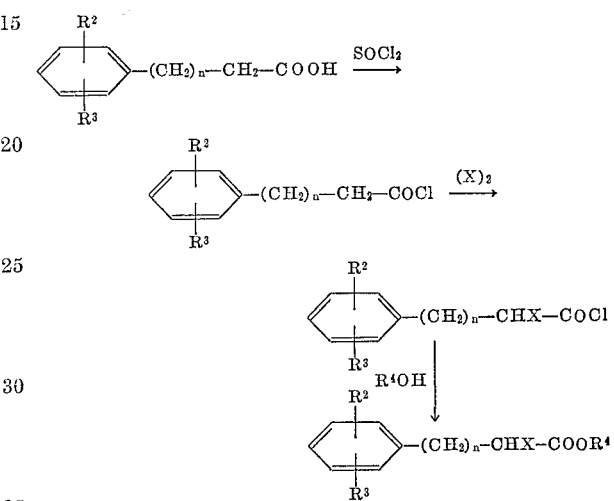

wherein $R^2$, $R^3$, X and $n$ are as defined above; $R^4$ represents an hydrocarbyl radical, for example, lower alkyl, aryl, etc.; $(X)_2$ is an halogenating agent such as chlorine, bromine, etc.; and $R^4OH$ represents an alcohol such as methanol, ethanol, phenol, etc.

The following examples are illustrative of the (alpha-phenoxy)- and (alpha-phenylthio)-omega-phenyl-alkanoic acids of the invention and the method by which they may be prepared. The examples are illustrative only and the invention should not be construed as being limited thereto.

Example 1.—Alpha-(4-chlorophenoxy)-beta-phenylpropionic acid

*Step A: Ethyl alpha-(4-chlorophenoxy)-beta-phenylpropionate.*—Sodium metal (8.0 g., 0.33 mole) is dissolved in 200 ml. of absolute methanol. 4-chlorophenol (43 g., 0.33 mole) and 81 g. of ethyl alpha-bromo-beta-phenylpropionate are then added and the mixture heated at reflux for 20 hours. The excess methanol is evaporated in vacuo, the residue is treated with 500 ml. of water and the resulting mixture is extracted with ethyl ether. The solution is dried and distilled to obtain 15.2 g. (16.5%) of an oil identified as ethyl alpha-(4-chlorophenoxy)-beta-phenylpropionate, B.P. 163–166° C./0.3 mm.

*Step B: Alpha-(4-chlorophenoxy)-beta-phenylpropionic acid.*—The ethyl alpha-(4-chlorophenoxy)-beta-phenylpropionate of Step A is mixed with 100 ml. of a 10% solution of sodium hydroxide and heated on the steam bath with stirring for one hour. The resulting solution is cooled, acidified with concentrated sulfuric acid and extracted with ethyl ether. The ether extract is dried over magnesium sulfate and the ethyl ether evaporated. The residue is recrystallized from a mixture of benzene and cyclohexane to obtain 12.3 g. (89% of alpha-(4-chlorophenoxy)-beta-phenylpropionic acid, which precipitates in the form of white platelets, M.P. 110–111° C.

*Analysis.*—Calculated for $C_{15}H_{13}ClO_3$: C, 65.10; H, 4.73; Cl, 12.81. Found: C, 65.49; H, 4.72; Cl, 12.66.

Example 2.—Alpha-(4-butyrylphenoxy)-beta-phenylpropionic acid

Sodium metal (18.5 g., 0.80 mole) is dissolved in 500 ml. of absolute methanol; 132 g. (0.80 mole) of 4-butyrylphenol and 190 g. of (0.80 mole) of methyl alpha-bromo-beta-phenylpropionate are then added and the mixture is heated at reflux for 20 hours. The excess methanol is evaporated in vacuo and the residue treated with 1 liter of water and extracted with two 1-liter portions of ethyl ether. The ethereal solution thus obtained is dried, evaporated to an oil and the oil taken up in 300 ml. of a 10% sodium hydroxide solution and heated on the steam bath wtih stirring for two hours. The hot solution is acidified with concentrated hydrochloric acid to yield an oil which forms a finely divided solid on cooling. The solid is dried at 60° C. in vacuo and then recrystallized from a mixture of benzene and cyclohexane to obtain 30 g. (12%) of alpha - (4-butyrylphenoxy)-beta-phenylpropionic acid as white plates, M.P. 88–91° C.

Example 3.—Alpha-(4-chlorophenoxy)-gamma-phenylbutyric acid

*Step A: Ethyl alpha-(4-chlorophenoxy)-gamma-phenylbutyrate.*—Sodium metal (2.8 g., 0.12 mole) is dissolved in 100 ml. of ethyl alcohol and 15.5 g. (0.12 mole) of 4-chlorophenol and 27.0 g. (0.10 mole) of ethyl alpha-bromo-gamma-phenylbutyrate is added to the solution. After heating under reflux for 16 hours, the solvent is evaporated and the non-volatile residual oil is dissolved in ether. The ethereal solution is washed by extraction with water and then distilled in vacuo. Ethyl alpha-(4-chlorophenoxy)-gamma-phenylbutyrate (13.0 g., 41% yield) is obtained as an oil which boils at 164–167° C. at 0.2 mm.

*Step B: Alpha-(4-chlorophenoxy)-gamma-phenylbutyric acid.*—The ethyl alpha - (4 - chlorophenoxy)-gamma-phenylbutyrate of Step A is stirred at 100° C. with 60 ml. of 10% sodium hydroxide for 30 minutes. The solution then is cooled, filtered and acidified to give an oil which slowly crystallizes. The crystalline solid is collected and recrystallized from a mixture of benzene and hexane to give 3.5 g. (12% yield) of alpha-(4-chlorophenoxy)-gamma-phenylbutyric acid which melts at 104–106°.

*Analysis.*—Calculated for $C_{16}H_{15}ClO_3$: C, 66.09; H, 5.20; Cl, 12.21. Found: C, 66.31; H, 5.25; Cl, 12.18.

By substituting the appropriate sodium phenolate or sodium thiophenolate and the appropriate methyl omega-phenyl-alpha-haloalkanoate for the 4-butyrylphenolate and methyl alpha-bromo-beta-phenylpropionate of Example 2 and following substantially the procedure described therein, the corresponding alpha-phenoxy- and alpha - phenylthio-omega-phenylalkanoic acid products may be prepared. The following equation and accompanying Table I depict the process of Example 1 and illustrate the starting materials and final products produced thereby.

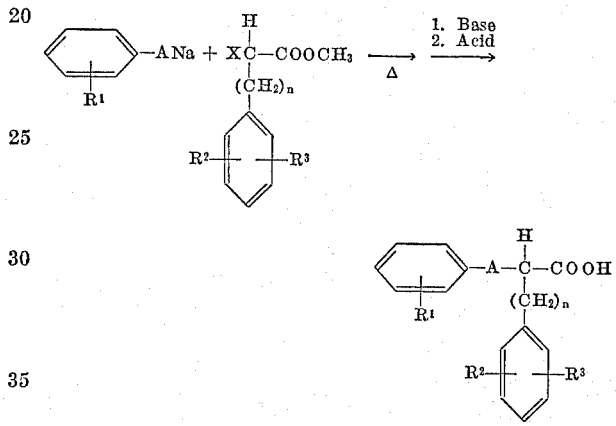

TABLE I

| Ex. | A | n | X | R¹ | R² | R³ |
|---|---|---|---|---|---|---|
| 4 | S | 1 | Cl | H | H | 4-Cl |
| 5 | O | 1 | Br | 4-Cl | H | 4-CH₃ |
| 6 | O | 1 | Br | 2-CH₂—CH=CH₂ | H | 4-OCH₃ |
| 7 | O | 2 | Cl | 3-CF₃ | 2-OCH₃ | 4-CH₃ |
| 8 | O | 1 | Br | 4-COCH₂—CH₃ | 2-Cl | H |
| 9 | S | 2 | Br | 4-⟨phenyl⟩ | H | 4-CH₃ |
| 10 | O | 2 | Br | 4-CH₂-⟨phenyl⟩ | 3-CH₃ | 4-OCH₃ |
| 11 | O | 1 | Cl | 3-NHC₂H₅ | 2-Cl | 4-Cl |
| 12 | O | 2 | Br | 2-O-⟨phenyl⟩ | 2-CH₃ | H |
| 13 | O | 2 | Cl | 4-OCH₂-⟨phenyl⟩ | 3-OCH₃ | 4-OC₂H₅ |
| 14 | O | 1 | Br | 4-CH=CH₂ | 3-OCH₃ | H |
| 15 | O | 1 | Br | 4-SCH₃ | H | H |
| 16 | O | 2 | Cl | 2-COOH | 4-Cl | 3-CH₃ |
| 17 | S | 1 | Cl | 4-CH₃ | H | 4-CH₃ |
| 18 | O | 2 | Br | 4-NH-⟨phenyl⟩ | H | 4-C₃H₇ |
| 19 | O | 2 | Br | 4-Cl | 2-OCH₃ | 3-CH₃ |
| 20 | S | 2 | Cl | 3-Cl | H | H |
| 21 | O | 1 | Br | 4-SO₂CH₃ | H | H |
| 22 | O | 1 | Cl | 3-NO | 2-CH₃ | H |
| 23 | O | 2 | Br | 2-CN | 3-CH₃ | 4-Cl |
| 24 | O | 1 | Cl | 3-NH₂ | H | H |
| 25 | O | 2 | Br | 4-S-⟨phenyl⟩ | H | 4-C₂H₅ |
| 26 | O | 1 | Br | 3-N(CH₃)₂ | 2-Cl | 4-Cl |
| 27 | O | 1 | Cl | 4-CH=CH-⟨phenyl⟩ | H | H |
| 28 | O | 1 | Br | 3-CF₃ | H | 4-Cl |
| 29 | O | 2 | Br | 3-CF₃ | H | 4-Cl |

The products of the invention can be administered in therapeutic dosages in conventional vehicles as, for example, by oral administration in the form of a tablet as well as by intravenous injection. The dosage of the (alpha-phenoxy)- and (alpha-phenylthio)-omega-phenyl-alkanoic acids may be varied over a wide range and for this purpose scored tablets containing 25, 50, 100, 150, 250 and 500 milligrams of the active ingredient may be made available to the physician for the symptomatic adjustment of the dosage to the individual patient. These dosages are well below the toxic or lethal dose of the compounds.

A suitable unit dosage form of the products of this invention can be prepared by mixing 50 mg. of alpha-phenoxy- or alpha-phenylthio-omega-phenyl-alkanoic acid or a suitable acid addition salt, ester or amide derivative thereof with 150 mg. of lactose and placing the 200 mg. of mixture into a No. 3 gelatin capsule. Similarly, by employing more of the active ingredient and less lactose other dosage forms can be put up in No. 3 gelatin capsules and should it be necessary to mix more than 200 mg. of ingredients together, larger capsules can be employed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known hypocholesterolemic agents or with other desired therapeutic and/or nutritive agents in dosage unit form.

There is no clear agreement about the actual role of cholesterol synthesis in the localization of atherosclerotic plaques, but numerous studies support the concept that cholesterol plays a major role in the pathogenesis of atherosclerosis because along with other lipids and fibrin it is the substance that accumulates in the arterial intima and subintima and produces arterial corrosion.

Since cholesterol is present to some extent in all ordinary diets and since it is also synthesized by various body organs from intermediates of metabolic origin, the development of some chemotherapeutic agent which will induce a significant reduction in the serum cholesterol level has been found desirable. To this end the (alpha-phenoxy) and (alpha-phenylthio)-omega-phenyl-alkanoic acids of this invention were tested and found to exhibit good hypocholesterolemic activity. Thus, in a comparison with other known compounds, the instant products compare most favorably in protecting against induced hypercholesterolemia and combine the unexpected advantage of low toxicity with little or no undesirable side effects. Furthermore, the products of this invention have shown themselves to be metabolically more acceptable than many other chemotherapeutic agents used in the treatment of atherosclerosis and may be taken orally as part of a diet with good ingestion by the body system. For this purpose the compounds of this invention may be administered in the form of a pharmacologically acceptable acid addition salt and in admixture with a pharmaceutical carrier.

It will be apparent from the foregoing description that the (alpha-phenoxy) and (alpha-phenylthio) substituted omega-phenyl-alkanoic acids of the present invention and the salts, esters and amides thereof, constitute a valuable class of compounds which have not been prepared heretofore. One skilled in the art will also appreciate that the process disclosed in the above examples are merely illustrative and are capable of wide variation and modification without departing from the spirit of this invention.

I claim:

1. A member selected from the group consisting of a compound of the formula:

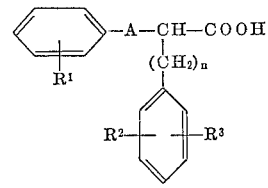

wherein A is a member selected from the group consisting of oxygen and sulfur; $R^1$ is a member selected from the group consisting of halogen, lower alkenyl, haloalkyl, lower alkanoyl, aryl, aralkyl, aralkenyl, aryloxy, aralkoxy, arylthio, arylamino, carboxy, lower alkylthio, lower alkyl sulfonyl, cyano, nitroso, amino, mono-alkylamino and dialkylamino; $R^2$ and $R^3$ are the same or different members selected from the group consisting of hydrogen, halogen, lower alkyl and lower alkoxy; and $n$ is an integer having a value of one to two; and the non-toxic, pharmacologically acceptable acid addition salts, lower alkyl esters, amides, lower alkylamides and di-lower alkylamide derivatives thereof.

2. A compond of the formula:

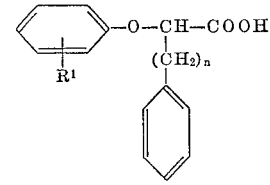

wherein $R^1$ is halogen and $n$ is an integer having a value of one to two.

3. A compound of the formula:

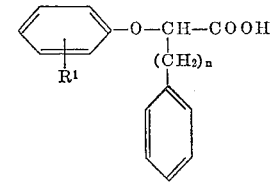

wherein $R^1$ is a lower alkanoyl and $n$ is an integer having the value of one to two.

4. Alpha - (4 - chlorophenoxy) - beta-phenylpropionic acid.

5. Alpha - (4 - butyrylphenoxy) - beta - phenylpropionic acid.

6. Alpha - (4 - chlorophenoxy) - gamma - phenylbutyric acid.

References Cited

Mamaev et al.: "Synthesis of Some Chlorophenoxy Derivatives," C. A., vol. 47 (1953), pp. 12, 287.

LORRAINE A. WEINBERGER, *Primary Examiner.*

S. B. WILLIAMS, D. E. STENZEL,
*Assistant Examiners.*

Notice of Adverse Decision in Interference

In Interference No. 96,998 involving Patent No. 3,378,582, W. A. Bolhofer, (α-PHENOXY)- AND (α-PHENYLTHIO)-OMEGA-PHENYL-ALKANOIC ACIDS, final judgment adverse to the patentee was rendered June 30, 1971, as in claims 1 and 2.

[*Official Gazette August 10, 1971*]